Sept. 20, 1932.   J. MIHALYI   1,878,967

OPTICAL SYSTEM FOR PROJECTION OF COLOR PICTURES

Filed July 1, 1929

Inventor
Joseph Mihalyi
By N. M. Perrex
Attorney

Patented Sept. 20, 1932

1,878,967

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

OPTICAL SYSTEM FOR PROJECTION OF COLOR PICTURES

Application filed July 1, 1929. Serial No. 375,199.

This invention relates to reversing systems for projection apparatus and more particularly to apparatus for projecting colored images.

When the ordinary black and white motion picture film is projected on a translucent screen and the projected image is viewed through the screen, the image is reversed from left to right unless the direction of the movement of the film through the projector is reversed from the direction from which it is moved when the image is reflected from a screen. This same condition also exists with still pictures.

However, with the system of color photography disclosed in the patent to Berthon 992,151 in which a film, lenticulated on its front surface, is exposed through a color screen; when such film is projected, the lenticulated surface must bear the same relation to the color filter during projection as existed during the photographing of the film. When using such lenticulated film, it is, therefore, impossible to reverse the film as in the case of black and white projectives since otherwise the color effect is entirely lost.

In accordance with the present invention a reversing system is provided for projection apparatus whereby the usual black and white film and the lenticulated film may be projected for observation through a translucent screen without the undesired reversal effect. Another feature of the invention comprises a unit including a detachable three-color filter and a reversing system for projecting colored images through a translucent screen so that the projected image is not reversed from left to right.

Figure 1:
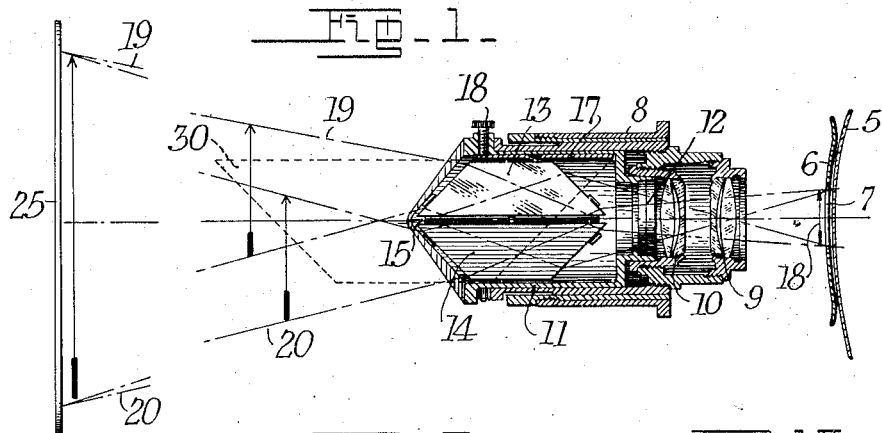
Figures 1A, 2:
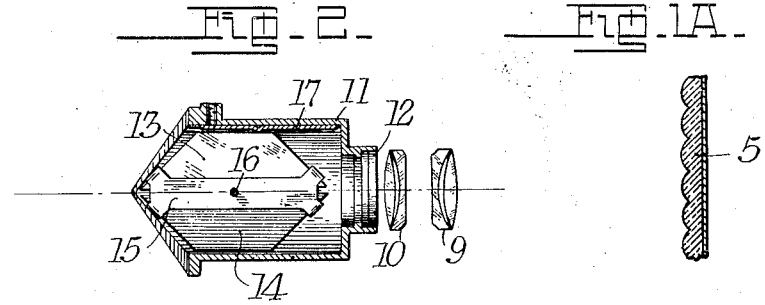
Figure 3:
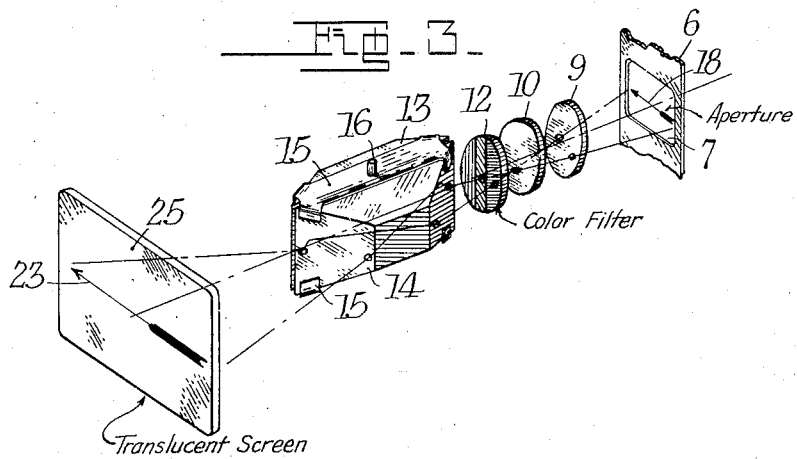

For a clearer understanding of the invention reference is made to the drawing in which Fig. 1 is a view of a system of projection of the present invention including a partial cross section of a complete assembly of the reversing system and the color filter together with the projection lens combination of the usual projection device; Fig. 1A is an enlarged cross section of the lenticulated film of Fig. 1; Fig. 2 is a partial section of the reversing unit and a color filter together with the lenses of the projection device; while Fig. 3 represents the projection optics in prospective and in connection with the light path through the system and the translucent screen.

In Fig. 1, 5 designates a film bearing images to be projected. If motion pictures are desired, this film is moved by well-known film advancing means (not shown) to successively advance the frames of the film behind the aperture 7 in the gate 6. This projecting equipment, which may be of standard make, includes a projection lens barrel 8 having the well-known lens combinations 9 and 10. In order to overcome the mentioned reversal effect, a reversing unit of the present invention shown in partial cross section in Fig. 2 is provided which includes a cylinder 11 of such diameter that it may be inserted within the barrel 8 of the projector. At one end of this cylinder there is frictionally held a three-section color filter unit 12 having the color bands red, green and blue arranged as shown in Fig. 3. Within this cylinder there are mounted two dove prisms 13 and 14 with their reflecting surfaces in substantial registry in which positions they are held by brackets 15 secured in position by a small rod 16 mounted in the walls of the cylinder and passing between the two prisms. This rod also serves as a pivot on which one of the prisms such as 13 may move under the influence of a leaf spring 17 bearing on its surface at a point near one of its ends, and a thumb screw 18 adjustable to cause the free end of the spring 17 to bear on the surface of this prism near its other end. By this construction prism 13 is capable of very limited rotation on the rod 16 so that the relation between these prisms can be changed to effect the superimposing of the picture fields independently projected through each prism onto the screen; thus converging, diverging and parallel projection is accommodated.

If we assume that the equipment just described is mounted for use as shown in Fig. 1, light from a source (not shown) passing from the right, through the lenticulated photographic film 5 and aperture 6 of the gate 7 may be traced through the optical system as follows. If we further assume that the object is an arrow 18, then a ray passing from the upper part thereof as represented by the line 19, passes through the projection lenses of the projector wherein it undergoes the well-known reversion and erection and is incident on the 45° incline entering face of the prism 13 where it is refracted to strike the reflecting surface of the prism. It is then reflected and undergoes the desired reversion. When, however, this ray reaches the 45° face of emergence of this prism it is refracted to the translucent screen 25. Similarly other rays such as 20 may be traced through the optical system of the projector and through the dove prism 14 to screen 25, from which it will be seen that object 18 will be projected on screen 25 as image 23 without the right to left reversal.

While the use of a single reversing prism might suggest itself such an arrangement is not operative for the mentioned method of color photography projection as will be readily understood by reference to Fig. 1 wherein such a prism is represented in dotted lines and designated 30. It will be seen from this diagram that certain of the rays such as 19 and 20 emerge outside of the field of this prism so that the effect of many of the red and blue rays is lost and the true color values of the projected image are entirely destroyed. While such a single prism can be used for black and white projection, it reduces the brightness of the pictures an amount proportional to the light lost, as represented by the rays 19 and 20. Aside from such undesirable results the single prism 30 is relatively long and the projector is therefore rendered bulky, a disadvantage which is particularly objectionable since projectors must be made portable.

This invention has been described in connection with lenticulated film for color projection but it will be understood that if the color filter 12 is removed, lenticulated film or the usual film may be used for the projection of black and white pictures without the reversal of the image even with normal direction of film movement.

The present disclosure is merely by way of illustration and there may be any variations and modifications thereof within the scope of the claims without departing from the present invention.

What I claim is:

1. A projection system for use in the projection of natural color images from a lenticular film upon a screen and comprising a gate with a projection window and adapted to support therein a film with a lenticulated front surface and an image bearing rear surface, an objective in front of said window, a multicolor filter associated with said objective, a reversing system comprising two reversing prisms face to face symmetrically of the system in front of the objective and so close to the objective and filter that all rays passing from the window through the objective and filter will also pass through the reversing system and a screen, whereby a single reversed image of a film at the window may be projected on the screen.

2. A projection system for use in the projection of natural color images from a lenticular film upon a translucent screen and comprising a gate with a projection window, a film in said gate having lenticulations on its front surface and color component images on its rear surface in alignment with the lenticulations, an objective in front of said gate, a multicolor filter in front of said objective, a reversing prism system in front of said filter and so close thereto as to intercept all rays passing from the entire window through the objective and filter, said system comprising two reversing prisms face to face symmetrically of the projection system, and a translucent screen, the prisms being adjustable, whereby a single reversed image of the film at the window may be projected on said screen.

Signed at Rochester, New York, this 26th day of June, 1929.

JOSEPH MIHALYI.